United States Patent
Halmos et al.

(10) Patent No.: US 6,650,685 B2
(45) Date of Patent: Nov. 18, 2003

(54) SINGLE LASER TRANSMITTER FOR Q-SWITCHED AND MODE-LOCKED VIBRATION OPERATION

(75) Inventors: Maurice J. Halmos, Encino, CA (US); Robert D. Stultz, W. Los Angeles, CA (US)

(73) Assignee: Raytheon Company, Lexington, MA (US)

( * ) Notice: Subject to any disclaimer, the term of this patent is extended or adjusted under 35 U.S.C. 154(b) by 146 days.

(21) Appl. No.: 09/861,218

(22) Filed: May 18, 2001

(65) Prior Publication Data

US 2002/0051470 A1 May 2, 2002

Related U.S. Application Data

(60) Provisional application No. 60/245,250, filed on Nov. 2, 2000.

(51) Int. Cl.[7] .............................................. H01S 3/08
(52) U.S. Cl. ........................ 372/100; 372/10; 372/18; 372/92; 372/99
(58) Field of Search ........................ 372/10, 18, 92, 372/99, 100

(56) References Cited

U.S. PATENT DOCUMENTS

| | | |
|---|---|---|
| 3,757,249 A | 9/1973 | Johnson et al. |
| 4,914,658 A * | 4/1990 | Stankov et al. .............. 372/18 |
| 5,305,334 A * | 4/1994 | Margalit et al. .............. 372/32 |
| 5,394,415 A * | 2/1995 | Zucker et al. .............. 372/26 |
| 5,917,843 A | 6/1999 | Greene |
| 6,275,512 B1 * | 8/2001 | Fermann .............. 372/6 |
| 6,393,035 B1 * | 5/2002 | Weingarten et al. .............. 372/18 |

OTHER PUBLICATIONS

Hideur, A. et al., "Mode–lock, Q–Switch and CW Operation of an Yb–Doped Double–Clad Fiber Ring Laser", Optics Communcations, North–Holland Publishing Co., Amsterdam, NL, vol. 198, No. 1–3, Oct. 15, 2001 (Oct. 15, 2001), pps. 141–146, XP004308635, ISSN: 0030–4018 (the whole document).

* cited by examiner

*Primary Examiner*—Eddie Lee
*Assistant Examiner*—Matthew E. Warren
(74) *Attorney, Agent, or Firm*—Colin M. Raufer; Leonard A. Alkov; Glenn H. Lenzen, Jr.

(57) ABSTRACT

A multifunctional laser (10) which, in a first operational mode, outputs a mode-locked beam for vibration sensing applications and, in a second operational mode, outputs a Q switched illumination beam for imaging applications. The inventive laser (10) includes a resonant cavity (110, 120, 190); a gain medium (100) disposed with the cavity; a first arrangement (150) in communication with the medium for causing a Q-switched signal to be transmitted from the cavity; a second arrangement (180) in communication with the medium for causing a mode-locked signal to be transmitted from the cavity; and a mechanism (130, 140) for switching between the first arrangement and the second arrangement.

9 Claims, 2 Drawing Sheets

FIG. 1a
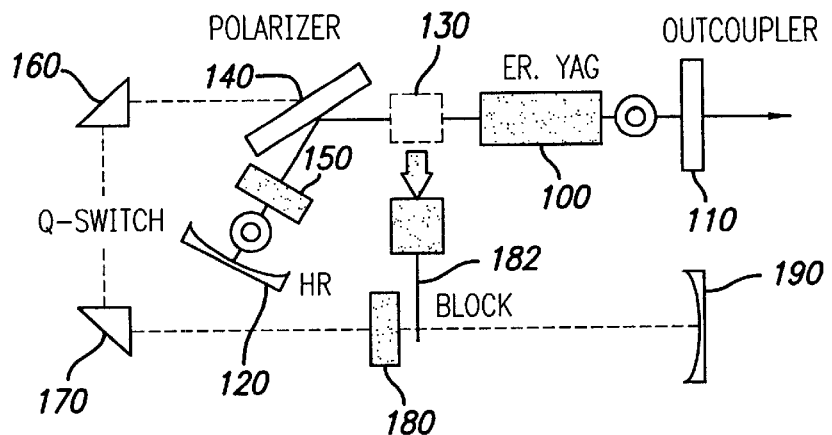
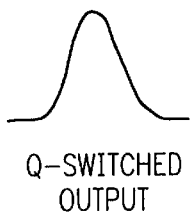
FIG. 1b
FIG. 2a
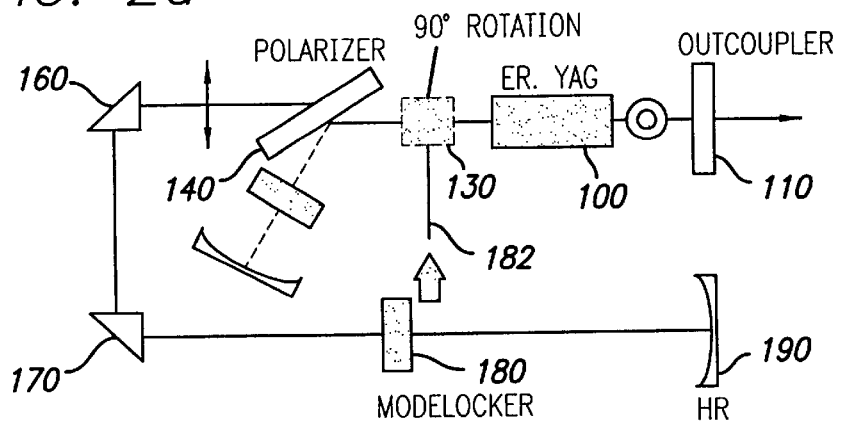
FIG. 2b
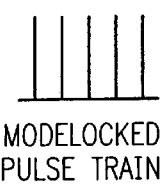

$S_t(t) = E_0 e^{j2\pi f_m t} + c.c.$

SINGLE LASER TRANSMITTER FOR Q-SWITCHED AND MODE-LOCKED VIBRATION OPERATION

This application claims the benefit of Provisional application 60/245,250 filed on Nov. 2, 2000.

BACKGROUND OF THE INVENTION

1. Field of Invention

The present invention relates to laser based systems and methods. More specifically, the present invention relates to eyesafe ladar transmitters.

2. Description of the Related Art

Current applications require highly accurate laser transmitters for high resolution ranging (one-dimensional profiling) and/or laser illumination for two-dimensional and three-dimensional sensing applications. For example, one-dimensional profiling allows for the target returns to be matched against a database to identify the target type. For two and three-dimensional sensing applications, a tight, highly accurate sensing pulse is transmitted and used to illuminate features of a target. The tight pulses reflect off of various surfaces of the target differently and reflect return pulses which are processed with sophisticated signal processing algorithms to yield more complete images of the target. Two-dimensional and three-dimensional imaging allows for a display of the target return data or an image of the target based on data from a stored database.

One of the main problems with multi-sensor eyesafe ladar systems is the prohibitively high cost of the transmitter component. Current approaches to eyesafe ladar transmitter design involve Optical Parametric Oscillator (OPO) shifting of the Nd:YAG laser to 1.5 micron.

For the above-noted sophisticated vibration sensing applications and other applications, separate laser transmitters have been required. Unfortunately, the use of multiple transmitters adds significantly to the cost and weight of deployment and would be impractical for many significant applications. That is, using separate transmitters for each sensor function necessitates complex beam-combining optics or requires multiple transmit apertures. In either case, the size and weight (and cost) are significantly increased. Producing both Q-switched and coherent mode-locked modes in a single Nd:YAG OPO would be complex and costly.

No approaches are known to exist for combining both high pulse energy Q-switched and coherent mode-locked functions in the same transmitter. Hence, there is a need in the art for a simple, accurate, low cost, efficient laser transmitter suitable for use in remote, long range, vibration sensing applications which may be implemented in a single laser transmitter capable of performing single point ranging, one-dimensional profiling and/or laser illumination for two-dimensional and three-dimensional sensing applications.

SUMMARY OF THE INVENTION

The need in the art is addressed by the multifunctional laser of the present invention. In a particular embodiment, the present teachings are implemented in a multifunctional laser which, in a first operational mode, outputs a mode-locked beam and, in a second operational mode, outputs a Q switched illumination beam. The inventive laser includes a resonant cavity; a gain medium disposed with the cavity; a first arrangement in communication with the medium for causing a Q-switched signal to be transmitted from the cavity; a second arrangement in communication with the medium for causing a mode-locked signal to be transmitted from the cavity; and a mechanism for switching between the first arrangement and the second arrangement.

In the illustrative embodiment, the switching mechanism consists of a 90 degree rotator, a beam block, and a polarizer. The first arrangement may be implemented with a Q switch. The second arrangement may be implemented with a quantum well absorber or an acoustic crystal.

Unlike the single mode laser transmitters that typify the prior art, the mode-locking mechanism of the present invention causes the laser to output energy at all modes within the gain profile in phase with one another. The result is a series of tight clean pulses which may be used for range resolved vibration and one-dimensional (high resolution ranging) applications.

Hence, in accordance with the present teachings, a single transmitter is provided which enables both functions using only a small mechanical switching mechanism to move one optic and a beam block. Both Q-switched and mode-locked beams emit from the same aperture with the same polarization, thus allowing common beam steering and shaping optics to be shared for both functions (e.g., only a single telescope).

In the illustrative embodiment, the laser is an erbium or erbium, ytterbium-doped, fiber pumped laser and the mode-locking mechanism is a passive quantum well absorber crystal or an active acoustic crystal mounted in the laser cavity. The high pulse energy, Q-switched mode can be used for 3D range imaging, and the coherent mode-locked mode can be used for RRV sensing and 1D target profiling. The invention allows for a single transmitter aperture with a common polarization, which means that the ladar beam-steering and telescope optics are shared between the multi-functions, thus reducing size, weight, and cost of the multi-sensor ladar system.

BRIEF DESCRIPTION OF THE DRAWING

FIG. 1a is a diagram of the optical configuration of the transmitter of the illustrative embodiment configured to provide a Q switched output.

FIG. 1b is a diagram illustrative of the output of the transmitter of the illustrative embodiment in the Q switched configuration.

FIG. 2a is a diagram of the optical configuration of the transmitter of the illustrative embodiment configured to provide a mode-locked output.

FIG. 2b depicts a mode-locked pulse train.

DESCRIPTION OF THE INVENTION

Figure 3:
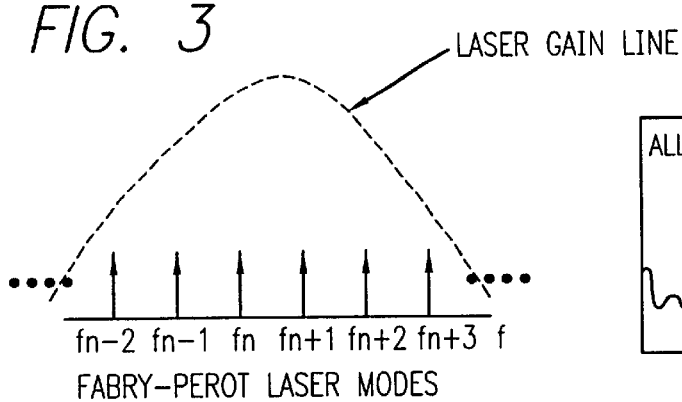
FIG. 3 is a diagram which illustrates the modes that exist within a laser cavity.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1a is a diagram of the optical configuration of the transmitter of the illustrative embodiment configured to provide a Q-switched output. The multifunctional transmitter 10 includes a gain medium 100 disposed in a optical cavity provided by a partially reflective output coupler 110 and a high reflectivity mirror 120. In the illustrative embodiment, the gain medium 100 is an erbium crystal pumped via optical fibers (not shown). Those skilled in the art will appreciate that the invention is not limited to an erbium crystal gain medium. Erbium, ytterbium-doped, crystal, $YVO_4$, or glass host or other suitable medium could be used without departing from the scope of the present teachings.

In the Q-switch mode, vertically polarized (s-polarized) energy from the gain medium is highly reflected by a polarizer 140 to a Q switch 150 disposed in the cavity in front of the high reflector 120. The beam block 187 prevents lasing in the alternate resonator path that is used in the modelocked mode of operation.

The optics which are used in the Q-switched function alone, such as the passive or active Q-switch element and the rear (HR, high reflector) mirror of the Q-switched resonator, are accessed only via the s-polarized beam path.

FIG. 1b is a diagram illustrative of the output of the transmitter of the illustrative embodiment in the Q switched configuration. In an illustrative embodiment, in the Q-switched configuration, the transmitter delivers high energy pulses of ~10 nanosecond duration. This transmitter configuration would be used in 3-D and 2-D imaging to illuminate a remote target with a single high-energy pulse.

FIG. 2a is a diagram of the optical configuration of the transmitter of the illustrative embodiment configured to provide a mode-locked output. In the mode-locked configuration, the rotator 130 is activated by mechanical switch. As a consequence, the vertically polarized output of the gain medium 100 is rotated to a horizontal polarization state by the rotator 130. The rotator 130 is fabricated of an optically active material (e.g. quartz) which, when inserted in the beam path, causes the light polarization to be rotated by 90 degrees. This is a standard, readily available, commercial component which is not particularly alignment sensitive, so it can be mechanically inserted. The function of this component is to keep the polarization of both Q-switched and mode-locked modes of operation within the same plane. This is critical in a ladar system where the beam-steering optics possess polarization-sensitive coatings. It is also critical for polarization sensitive laser crystals such as Erbium-doped $YVO_4$. The horizontally polarized energy passes through the polarizer 140 and is reflected by first and second fold mirrors 160 and 170 through a modelocker 180 to a second high reflector 190.

The mode-locked resonator path is 'p-polarized' (relative to the polarizer) which is highly transmitted by the polarizer. The optics that serve the mode-locked laser alone are accessed only via the p-polarized beam path. This architecture allows that the resonator lengths and the highly reflective mirrors to be optimized for each function individually, while the output aperture remains common. For example, the mode-locked resonator will have a considerably longer path length than that of the Q-switched resonator.

As is well known in the art, the outcoupler 110 and the high-reflector 190 of FIG. 2a provide a resonant cavity in which there are multiple resonant modes or frequencies. The frequencies are uniformly spaced at c/2l, where 'c' is the speed of light and 'l' is the length of the cavity. These modes are called Fabry-Perot laser modes and are depicted in FIGS. 2b and 3.

FIG. 2b depicts a mode-locked pulse train. In the illustrative embodiment, in the mode-locked configuration, a continuous train of coherent mode-locked pulses (sub-nanosecond durations) is emitted at average output powers on the order of 3 watts. This enables Range Resolved Vibration (RRV) measurements and 1-D profiling target identification.

FIG. 3 is a diagram which illustrates the modes that exist within a laser cavity relative to a laser gain line. When a gain medium is added to the cavity, a gain profile is provided as depicted in FIG. 3. With a gain medium inside the cavity, there will be a region in which there is optimal gain, i.e., each resonant mode under the gain line can lase. Energy at the laser modes within the gain profile lase and will be output by the outcoupler in random phases as depicted in FIG. 4.

Figure 4:
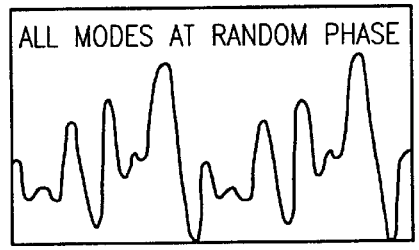
FIG. 4 is a diagram that illustrates the output of a typical laser with modes at random phase.

FIG. 4 is a diagram which illustrates the output of a typical laser with modes at random phase.

Figure 5:
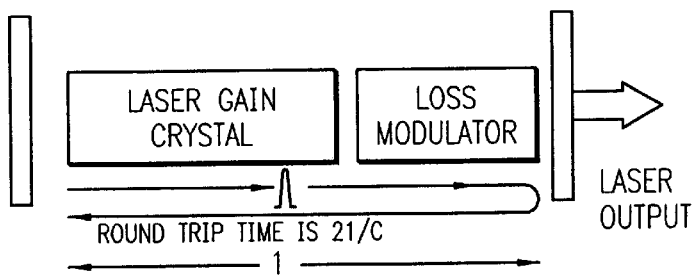
FIG. 5 is a simplified diagram of a typical laser cavity with a gain medium and a loss modulator disposed therein.

FIG. 5 is a simplified diagram of a typical laser cavity with a gain medium and a loss modulator disposed therein.

Figure 6:
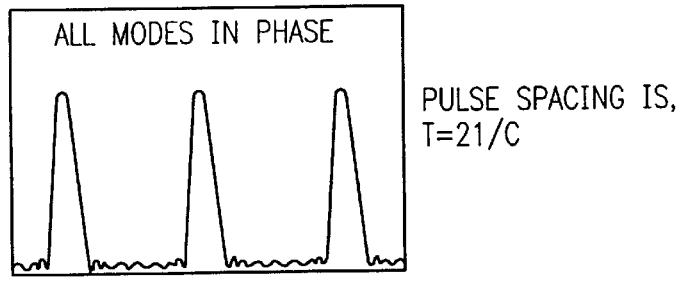
FIG. 6 is a diagram which illustrates the output of a typical laser with modes in phase.

FIG. 6 is a diagram which illustrates the output of a typical laser with modes in phase. Note that in FIG. 4, with the phases of the modes being random, the sine peaks do not line up for narrow pulses. However, the addition of a loss modulator to the cavity as depicted in FIG. 5 has the effect of lining up the modes such that the modes are in phase as depicted in FIG. 6. That is, the loss modulator excites all the modes under the gain line of the laser and keeps them in phase. The laser is said to be 'mode-locked' in that the modes under the gain line exist and are lined up in phase. This contrasts with the typical conventional single mode laser transmitter used for vibration sensing. Single mode laser transmitters generally employ a mode selection element, Etalon or seeded mode, to isolate a single mode and suppress the other modes under the gain line. This is depicted in FIG. 7.

Figure 7:
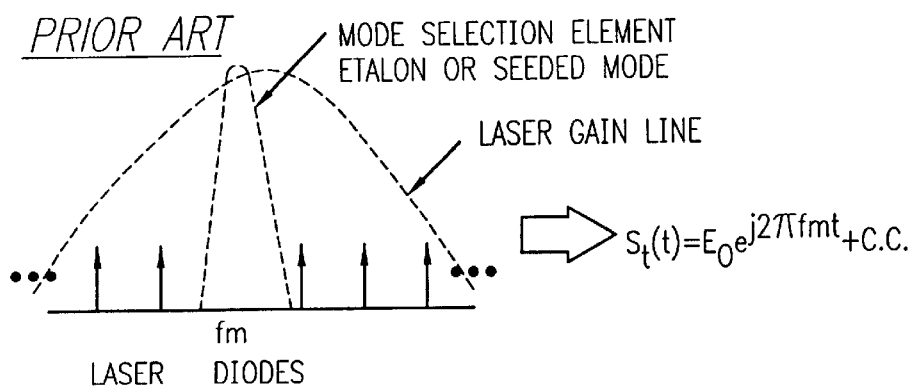
FIG. 7 is a diagram of the modes in a laser cavity having a mode selection element therein.

FIG. 7 is a diagram of the modes in a laser cavity having a mode selection element therein. Unfortunately, as mentioned above, the isolation of a single mode and the suppression of the other modes in a cavity is difficult and adds significantly to the cost and complexity of the system.

However, as illustrated in FIG. 2a, in accordance with the present teachings, instead of isolating a single mode and suppressing the other modes in the cavity, the mode-locking element 180 is added to excite the modes so that the modes line up in phase. The mode-locking element or loss modulator 180 can be: 1) a passive modelocker, i.e., a crystal that is normally opaque to light (does not let the light through) until it reaches a certain intensity threshold (e.g., a passive multiple quantum well absorber crystal such as gallium arsenide) or 2) an active mode-locker with an acoustic crystal which may be purchased from IntraAction Corp in Bellwood, Ill., or Brimrose Corp in Baltimore Md.

A beam blocker 182 is inserted in the mode-locked resonator in the Q-switched mode, in order to prevent parasitic mode-locked lasing, for the case that a passive mode-locker element is employed. The beam blocker 182 may not be necessary with an active mode-locker, since the mode-locker could simply be turned off. When in the mode-locked mode, a beam block in the Q-switched resonator path will probably not be needed since the laser threshold for Q-switched, high energy pulses will be significantly higher than that for a mode-locked train of pulses. The polarizer in this design may be any of several available low loss polarizers (e.g. thin film polarizer) at the laser wavelength within the eye safe band.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A multifunctional laser comprising:

a resonant cavity;

a gain medium disposed with the cavity;

first means in communication with the medium for causing a Q switched signal to be transmitted from the cavity;

second means in communication with the medium for causing a mode-locked signal to be transmitted from the cavity; and means for switching between the first means and the second means.

2. The invention of claim 1 wherein the first means includes a Q switch.

3. The invention of claim 1 wherein the second means includes a mode-locker.

4. The invention of claim 3 wherein the second means includes a quantum well absorber.

5. The invention of claim 4 wherein the second means includes an acoustic crystal.

6. The invention of claim 1 wherein the means for switching includes a phase rotator and a polarizer disposed between the gain medium, the first means and the second means.

7. The invention of claim 6 further including means for selectively activating the rotator.

8. A multifunctional laser comprising:

a resonant cavity;

a gain medium disposed with the cavity;

a Q-switch in communication with the medium for causing a Q switched signal to be transmitted from the cavity;

a mode-locker in communication with the medium for causing a mode-locked signal to be transmitted from the cavity; and a rotator and a polarizer for switching between the Q-switch and the mode locker.

9. A method for providing a multifunctional laser including the steps of:

providing a resonant cavity;

providing a gain medium within the cavity;

causing a Q switched signal to be transmitted from the cavity with a first arrangement in communication with the medium;

causing a mode-locked signal to be transmitted from the cavity with a second arrangement in communication with the medium; and switching between the first arrangement and the second arrangement.

* * * * *